(12) United States Patent
Chakrabarty

(10) Patent No.: US 10,834,287 B1
(45) Date of Patent: Nov. 10, 2020

(54) OBSCURING MARKER-OUTLINED FREE-FORM AREAS OF A DOCUMENT

(71) Applicant: LEXMARK INTERNATIONAL, INC., Lexington, KY (US)

(72) Inventor: Saikat Chakrabarty, Kolkata (IN)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 16/666,651

(22) Filed: Oct. 29, 2019

(51) Int. Cl.
*H04N 1/40* (2006.01)

(52) U.S. Cl.
CPC ..... *H04N 1/40062* (2013.01); *H04N 1/40093* (2013.01)

(58) Field of Classification Search
None
See application file for complete search history.

(56) References Cited

U.S. PATENT DOCUMENTS

| 2005/0265624 A1* | 12/2005 | Washio | H04N 1/4055 382/273 |
| 2008/0165376 A1* | 7/2008 | Tomohiro | G06T 7/13 358/1.9 |

* cited by examiner

*Primary Examiner* — Lennin R RodriguezGonzalez

(57) ABSTRACT

A method for eliminating one or more outlined sections of a document before printing is described herein. The method comprising receiving an input image of the document including the one or more outlined sections and a user input indicating color information of one or more outlines, identifying the one or more outlines and the one or more outlined sections of the image, obtaining the one or more outlined sections associated with the one or more outlines of the image, and outputting an output image to be printed, wherein the one or more outlined sections are eliminated from the output image of the document.

14 Claims, 14 Drawing Sheets

304

APPLICATION FORM

Name:        ABCD Co.
Position:    PQRS
Location:    Head Office
CODE:        DLH01982

Dear Sir/Madam,

_____
_____
_____
_____
_____
_____
_____

_____
_____
_____

Thank you,
Yours faithfully,

305

Name:
Phone number:
Guardian's Name:

FIG. 3B

APPLICATION FORM

Name:      ABCD Co.
Position:  PQRS
Location:  Head Office
CODE:      DLH01982

Dear Sir/Madam,

_____
_____
_____
_____
_____
_____
_____
_____
_____
_____

Thank you.
Yours faithfully,

Name:
Phone number:
Guardian's Name:

FIG. 6

APPLICATION FORM

Name: ABCD Co.
Position: PQRS
Location: Head Office
CODE: DLR01982

Dear Sir/Madam,

_____
_____
_____
_____
_____
_____
_____
_____
_____
_____

Thank you.
Yours faithfully,

Name:
Phone number:
Guardian's Name:

FIG. 9

OBSCURING MARKER-OUTLINED FREE-FORM AREAS OF A DOCUMENT

BACKGROUND

1. Field of the Disclosure

The present disclosure relates generally to electrophotographic image forming devices and, more particularly, to removing outlined sections from a document.

2. Description of the Related Art

During printing of a document, users often want to exclude certain sections of the document, which may be due to confidential content involved, for saving toner, or to ignore unnecessary information. These sections to be excluded might often be in free-form shapes rather than regular geometrical shapes like rectangle or square. For example, a user might want to print an article from a magazine without printing the images on it or print a confidential report leaving out any data about an individual, etc.

In the current art, in order to address the above mentioned need, the user initially needs to scan the document, crop and remove the unwanted section using some third-party cropping or redaction software (like Adobe Photoshop©, Microsoft Paint©, PDF Element©, Nitro©, etc.), save the modified image to another file, and then print the same. Thus, the process involves multiple steps and requires knowledge of the software. The user cannot just take the document to a copier and simply get the desired section of the document eliminated. Besides that, cropping a complicated free-form shape (for example, a human figure) using a mouse can be a very tedious and time-consuming job. It is very difficult to accurately outline and crop shapes, having several sharp edges, using a mouse.

Accordingly, the inventor recognizes a solution that enables the user to directly draw an outline, with a pen or marker, around a section of a document and get the document printed with that particular section eliminated.

SUMMARY

This summary is provided to introduce aspects related to systems and methods for system and method of dropping or obscuring marker-outlined free-form areas of a document and the aspects are further described below in the detailed description. This summary is not intended to identify essential features of the claimed subject matter nor is it intended for use in determining or limiting the scope of the claimed subject matter.

In one embodiment, a method for eliminating one or more outlined sections of a document before printing is disclosed. The method comprises receiving an input image of the document including the one or more outlined sections and a user input indicating color information of one or more outlines. The one or more outlines and the one or more outlined sections of the image are then identified. Further, the one or more outlined sections associated with the one or more outlines of the image are obtained. Finally, an output image to be printed is outputted, wherein the one or more outlined sections are eliminated from the output image of the document.

In some embodiments, the input image is stored as a matrix of Red-Green-Blue (RGB) values, which is converted and stored as a matrix of Hue-Saturation-Value (HSV) color space values representing the RGB matrix. In some embodiments, the method further comprising generating a first mask from the HSV color space values to identify the one or more outlines of the one or more outlined sections, wherein the one or more outlines have color lying within a lower range and an upper range of the HSV color space values of the color of the one or more outlines.

In some embodiments, the method further comprising generating a second mask of the one or more outlined sections of the input image including filling an external contour of the first mask with the color of the one or more outlines in a temporary copy of the input image and converting the temporary copy to HSV color space values. In some embodiments, the output image is obtained by performing a Bitwise OR operation between an altered copy of the input image and a background image. In some embodiments, the altered copy of the input image is generated by performing a Bitwise AND operation between a copy of the input image and a bitwise inverted copy of the second mask of the one or more outlined sections of the input image. In some embodiments, the background image is obtained by a Bitwise AND operation between an image with all white pixels and a Blue Green Red (BGR) image obtained from the second mask of the one or more outlined sections.

In another embodiment, a system for eliminating one or more outlined sections of a document before printing is disclosed. The system comprises one or more processors, and a memory storing processor-executable instructions that, when executed by the one or more processors, configure the one or more processors to receive an input image of the document including the one or more outlined sections and a user input indicating color information of one or more outlines, identify the one or more outlines and the one or more outlined sections of the image, obtain the one or more outlined sections associated with the one or more outlines of the image, and output an output image to be printed, wherein the one or more outlined sections are eliminated from the output image of the document.

In an example, a user draws a closed outline on a document, or a copy of the document if the user wants to keep the original document as is, with a pen or marker, enclosing the section the user wants to eliminate. Then, the user copies this document using a copier. Before copying, the user selects an option in the copy settings pane or panel to enable outlined area elimination. Once the option is enabled, the user specifies (or selects from a list) the color of the pen or marker used for drawing the outline. Now, when the user triggers the copy operation, an image processing process, as disclosed herein below gets invoked within a device. The outlined section from the document are detected and extracted. Further, prints of the document leaving out the content within that outlined section may be obtained. The system would be capable of identifying various shades of the specified pen/marker color. Thus, it is a simple one-step process to get a section of a document removed and printed, which enables even a layman to use.

BRIEF DESCRIPTION OF THE DRAWINGS

The accompanying drawings incorporated in and forming a part of the specification, illustrate several aspects of the present disclosure, and together with the description serve to explain the principles of the present disclosure.

FIG. 3B is a front perspective view of an output image of the document with the outlined sections removed, according to one example embodiment.

FIG. 6 shows an output with contour filled with color of the outline in a copy of original or input image, according to one example embodiment.

FIG. 9 is the image after making one more copy temp_rev of img and doing bitwise-and operation using mask_fill_inv, according to one example embodiment.

DETAILED DESCRIPTION

Figure 1:
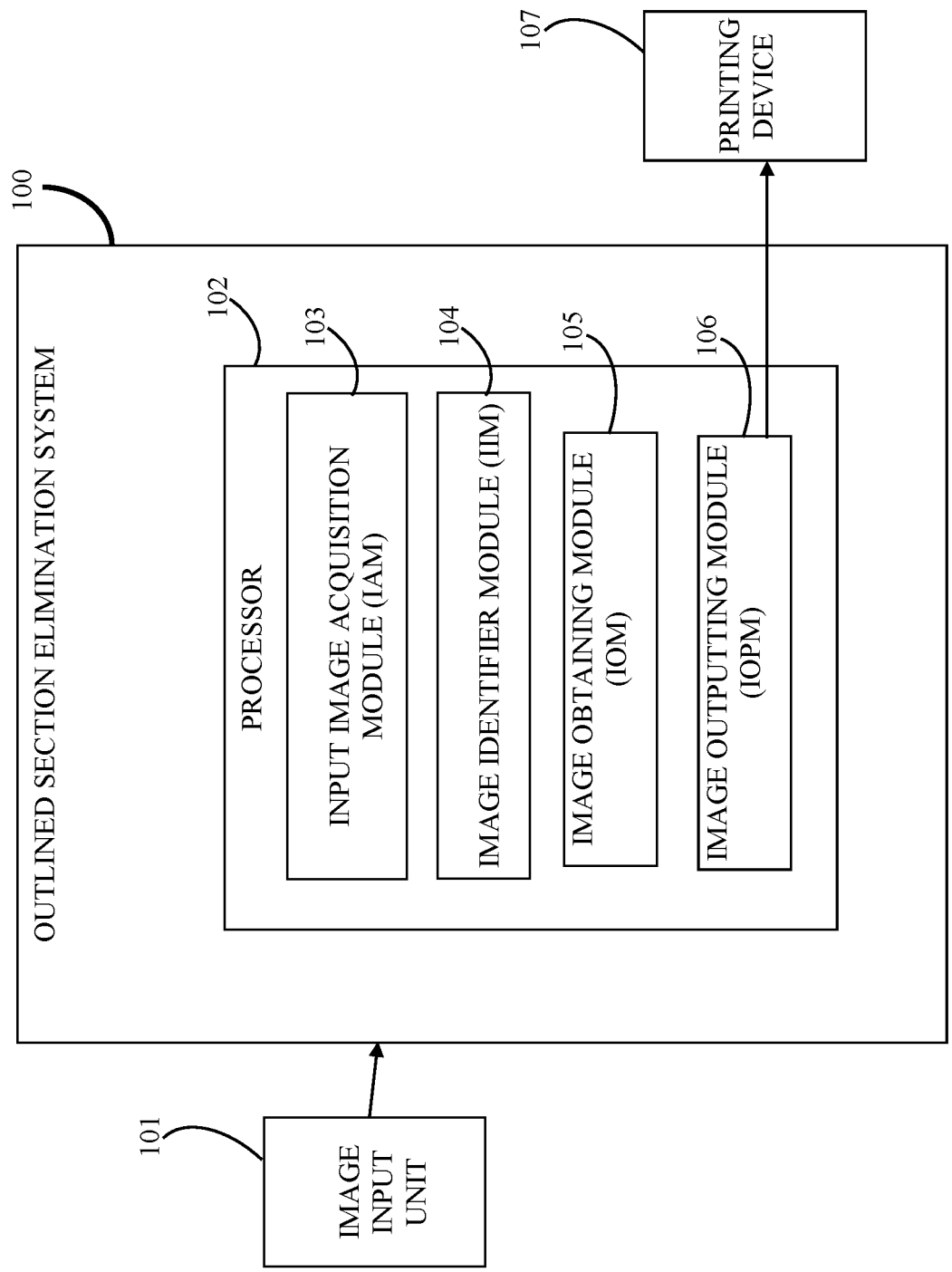
FIG. 1 is an outlined section elimination system that illustrates the different modules responsible for execution of the steps involved in eliminating outlined sections of a document before printing.

In the following description, reference is made to the accompanying drawings where like numerals represent like elements. The embodiments are described in sufficient detail to enable those skilled in the art to practice the present disclosure. It is to be understood that other embodiments may be utilized and that process, electrical and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Also, it is to be understood that the phraseology and terminology used herein is for the purpose of description and should not be regarded as limiting. The use herein of "including" "comprising" or "having" and variations thereof is meant to encompass the items listed thereafter and equivalents thereof as well as additional items. Further, the terms "a" and "an" herein do not denote a limitation of quantity but rather denote the presence of at least one of the referenced item.

It will be further understood that each block of the example flowcharts or diagrams, and combinations of blocks in the example flowcharts or diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the description below.

Accordingly, blocks of the example flowcharts and diagrams support combinations of means for executing the specified functions, combinations of actions or steps for performing the specified functions and program instruction means for performing the specified functions. It will also be understood that each block of the diagrams, and combinations of blocks in the diagrams, may be implemented by special purpose hardware-based computer systems or combinations of special purpose hardware and computer instructions that perform the specified functions, actions or steps.

These computer program instructions may also be stored in a non-transitory computer-readable memory that may direct a computer or other programmable data processing apparatus to function in a particular manner, such that the instructions stored in the computer-readable memory produce an article of manufacture, including an instruction means that implements the function specified in the block or blocks. The computer program instructions may also be loaded onto a computer or other programmable data processing apparatus to cause a series of operational actions or steps to be performed on the computer or other programmable apparatus to produce a computer implemented process such that the instructions that execute on the computer or other programmable apparatus implement the functions specified in the block or blocks.

Figure 3A:
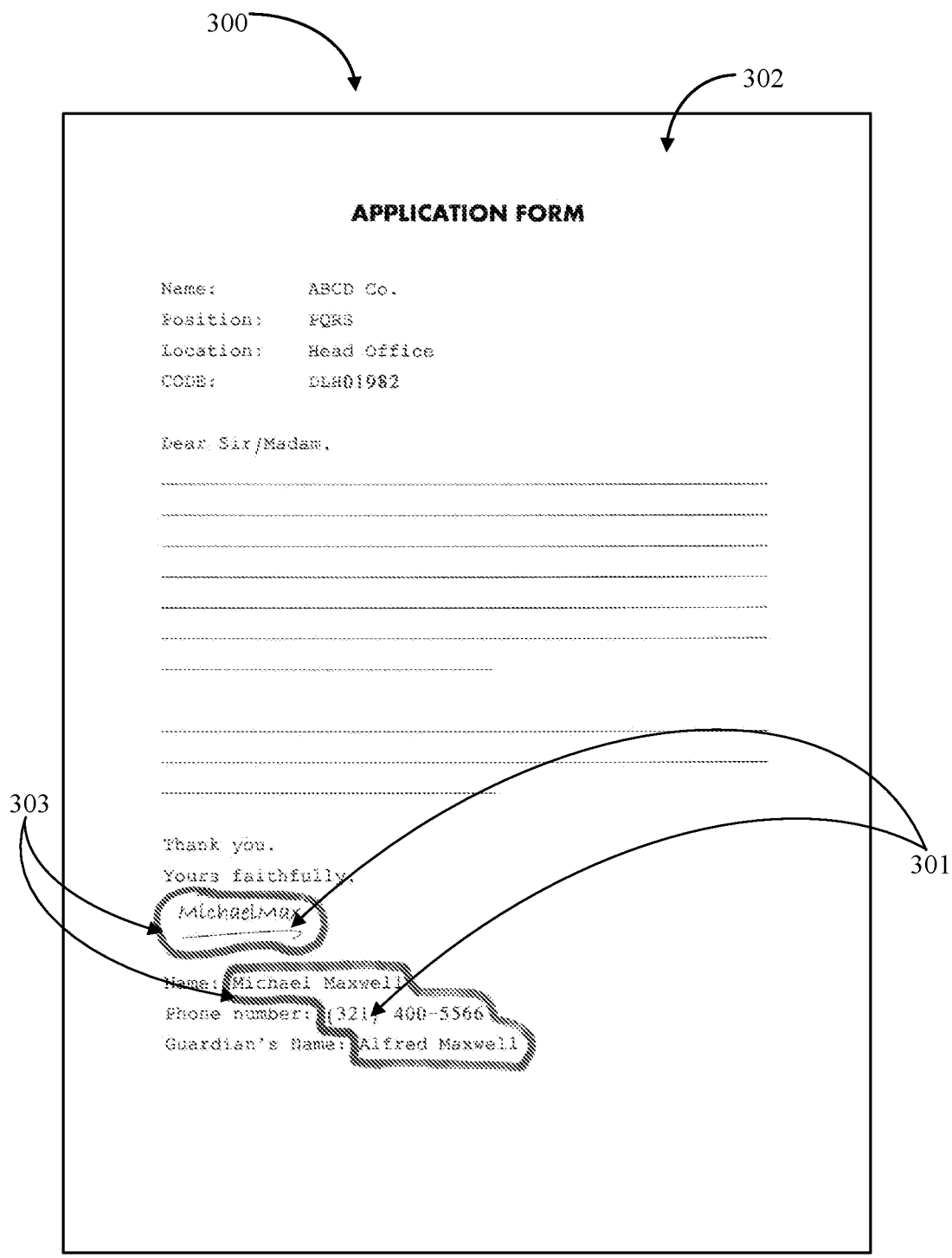
FIG. 3A is a front perspective view of an input image of a document, which is outlined more than once to define outlined sections, according to one example embodiment.

FIG. 1 is an outlined section elimination system 100 that illustrates different modules responsible for execution of steps involved in eliminating outlined sections 301, as shown in FIG. 3A, of a document 300 before printing. Outlined section elimination system 100 includes one or more processors 102. Processor includes multiple modules, such as, Input Image Acquisition Module (IAM) 103, Image Identifier Module (IIM) 104, Image Obtaining Module (IOM) 105, and Image Outputting Module (IOPM) 106. An input image 302 of document 300 is input through image input unit 101. IAM 103 receives input image 302 of document 300 including one or more outlined sections 301 and a user input indicating color information of one or more outlines 303. In an exemplary embodiment, a user draws a closed outline 303 on input image 302 of document (or a copy of document 300 if user wants to keep original document 300 as is) with a pen or marker, which encloses outlined sections 301 user wants to eliminate.

Subsequently, IIM 104 identifies one or more outlines 303 and one or more outlined sections 301 of input image 302. Here, user copies document 300 using a copier. Before copying, the user selects an option in copy settings pane or panel to enable elimination of outlined sections 301. Once the option for the elimination of outlined sections is enabled, user specifies (or selects from a list) a color of pen or marker used for drawing said one or more outlines 303. In an embodiment, the system 100 is configured to identify various shades of specified pen/marker color of the one or more outlines. Subsequently, IOM 105 obtains one or more outlined sections 301 associated with one or more outlines 303 of input image 302. Here, when user triggers copy operation, an image processing system is invoked within device, which detects and extracts outlined section 301 from input image 302 of document 300. Subsequently, IOPM outputs an output image 304, as shown in FIG. 3B, to be printed, wherein one or more outlined sections 301 are eliminated from output image 304 of document 300. In another embodiment, system prints document 300 on a printing device 107 leaving out content within that outlined section 301. Thus, it is a simple one-step process to get a section 301 of a document 300 removed (305 in FIG. 3B) and printed, which enables even a layman to use. Although the present disclosure is explained considering that the system 100 is implemented on a copier machine, it is appreciated that the system 100 may also be implemented in a variety of computing systems, including, but not limited to, a cloud-based environment.

Figure 2:
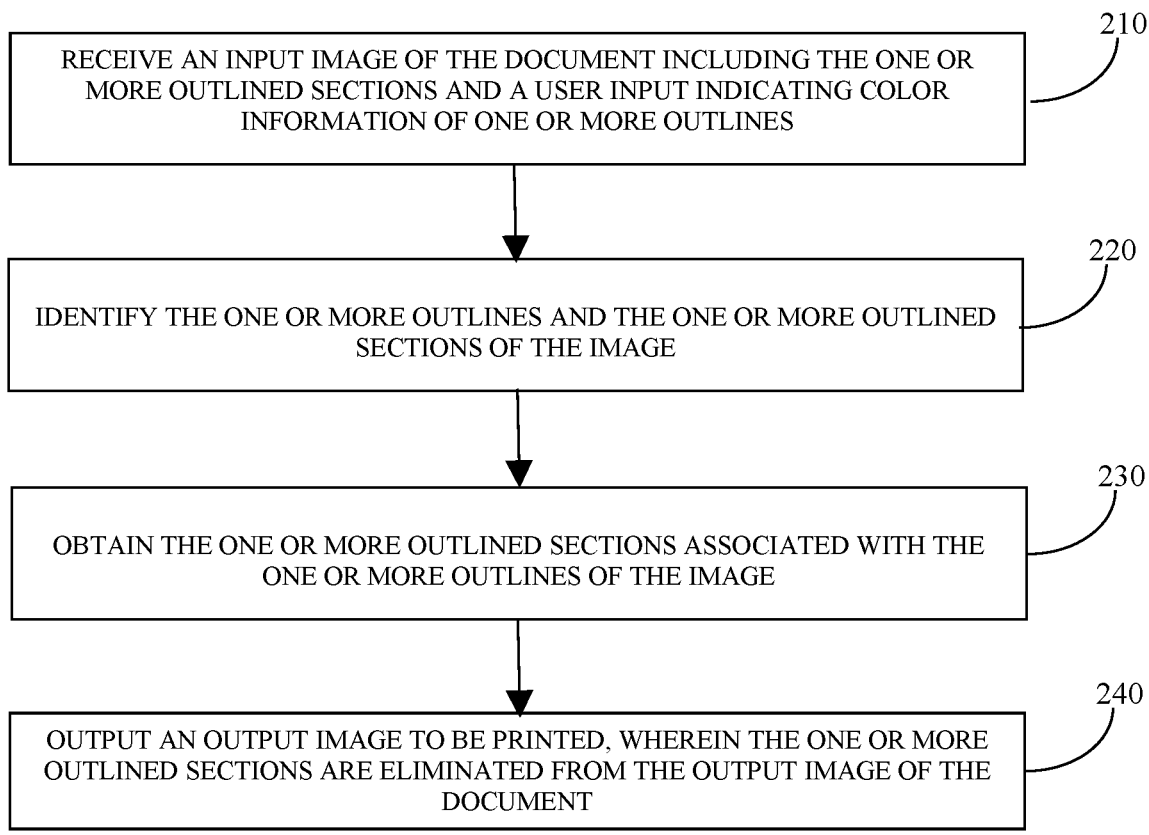
FIG. 2 is a flow diagram that shows a method of eliminating outlined sections of a document before printing, according to one example embodiment.

FIG. 2 is a flow diagram that shows a method of eliminating outlined sections 301 of a document 300 before printing, according to one example embodiment, FIG. 3A is a front perspective view of an input image 302 of document 300, which is outlined more than once to define outlined sections 301, and FIG. 3B is a front perspective view of an output image 304 of document 300 with outlined sections 301 removed, as denoted by reference numeral 305 in FIG. 3B. In an embodiment, the method of FIG. 2 may be performed by a system illustrated in FIG. 1. Based on method in FIG. 2 and perspective views in FIGS. 3A and 3B respectively, the method includes receiving 210 an input image 302 of document 300 that includes one or more outlined sections 301 and a user input that indicates color information of one or more outlines 303. After reception 210 of input image, the method includes identifying 220 one or more outlines 303 and one or more outlined sections 301 of image. After identification 220 step, the method includes obtaining one or more outlined sections 301 associated with one or more outlines 303 of input image 302. Finally, the method includes outputting 240 an output image 304 to be printed, wherein one or more outlined sections 301 are eliminated from output image 304 of document 300.

To summarize, the device accepts an outlined digital document 300 as input image 302 and outputs an output image 304 without section 301 lying inside marked outline 303. This modified output image 304 is eventually printed and user would not require any additional third-party tool. User uses a pen, marks an outline 303 around a section 301 to be removed and get document 300 copied from copier instantly. For instance, where a user has a filled up a form with confidential personal information and needs a similar form for another person, then user can just mark an outline 303 around the confidential personal information and get that form printed without previous individual's personal details (FIGS. 3A and 3B).

In such a case, outlined document 300 should be scanned beforehand using any color scanner device or mobile phone. When the user uploads the scanned outlined document 300 to cloud-based application, user is prompted to specify color of drawn outline 303. Once upload completes, the system would eliminate outlined area or outlined section 301. Output image 304 is configured to be downloaded or sent to any connected printer for printing. Hosting application on a cloud-platform also lets users access it from anywhere. Suppose, a user is traveling and needs to remove an image from a report, the user can draw an outline 303 on report, take a photo on his/her mobile phone and upload same to the Cloud platform. A report without image may be then downloaded right away or printed on reaching his/her office. There may be a wide range of applications for a given method for elimination of outlined sections 301 from document 300, which are: redact or obscure confidential information from a document 300, remove images from a document 300 for green printing, eliminate unnecessary content from reports, etc. Thus, this aforementioned feature brings in a lot of convenience and extra functionalities for users. Even a layman without much computer-literacy can utilize this feature.

Figure 4A:
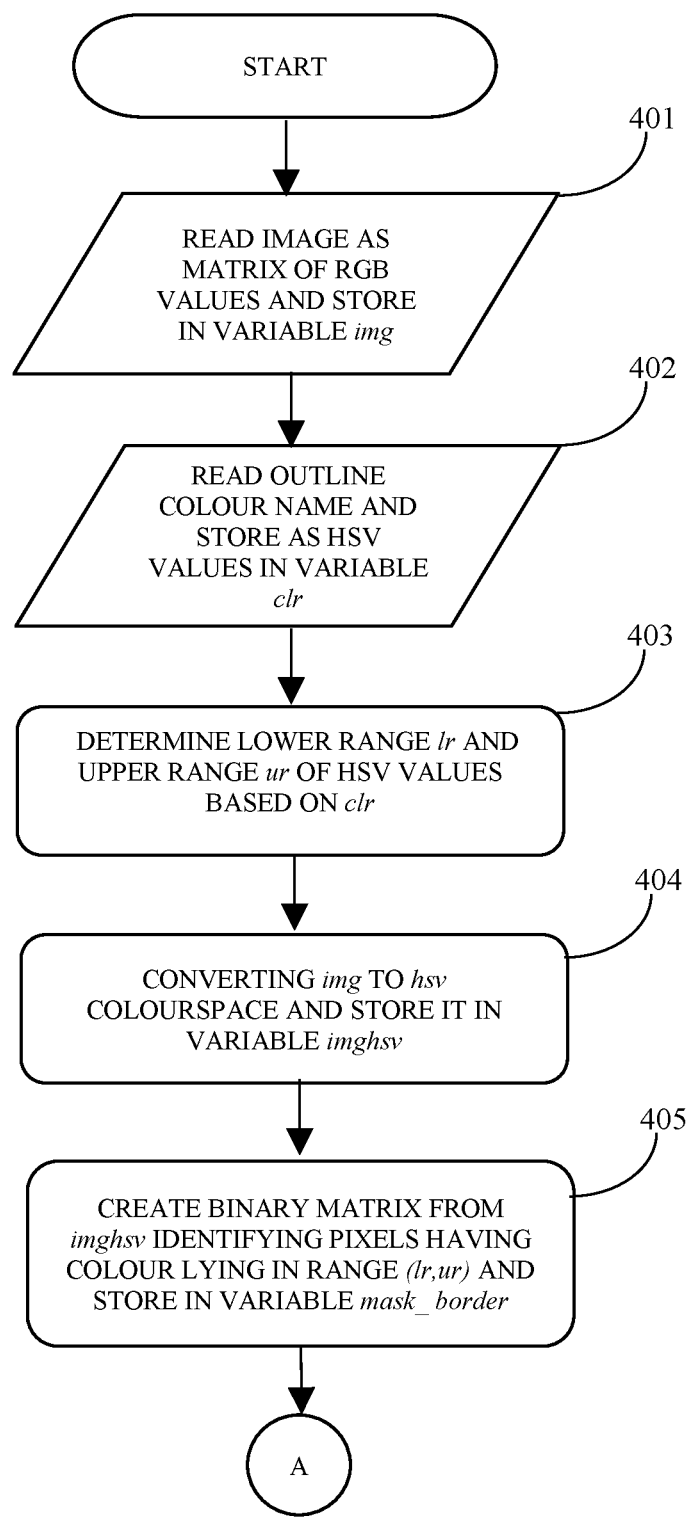
FIGS. 4A-4C illustrate a flow chart that explains the operations performed by the processor in executing the method of eliminating outlined sections of a document before printing, according to one example embodiment.
Figure 4B:
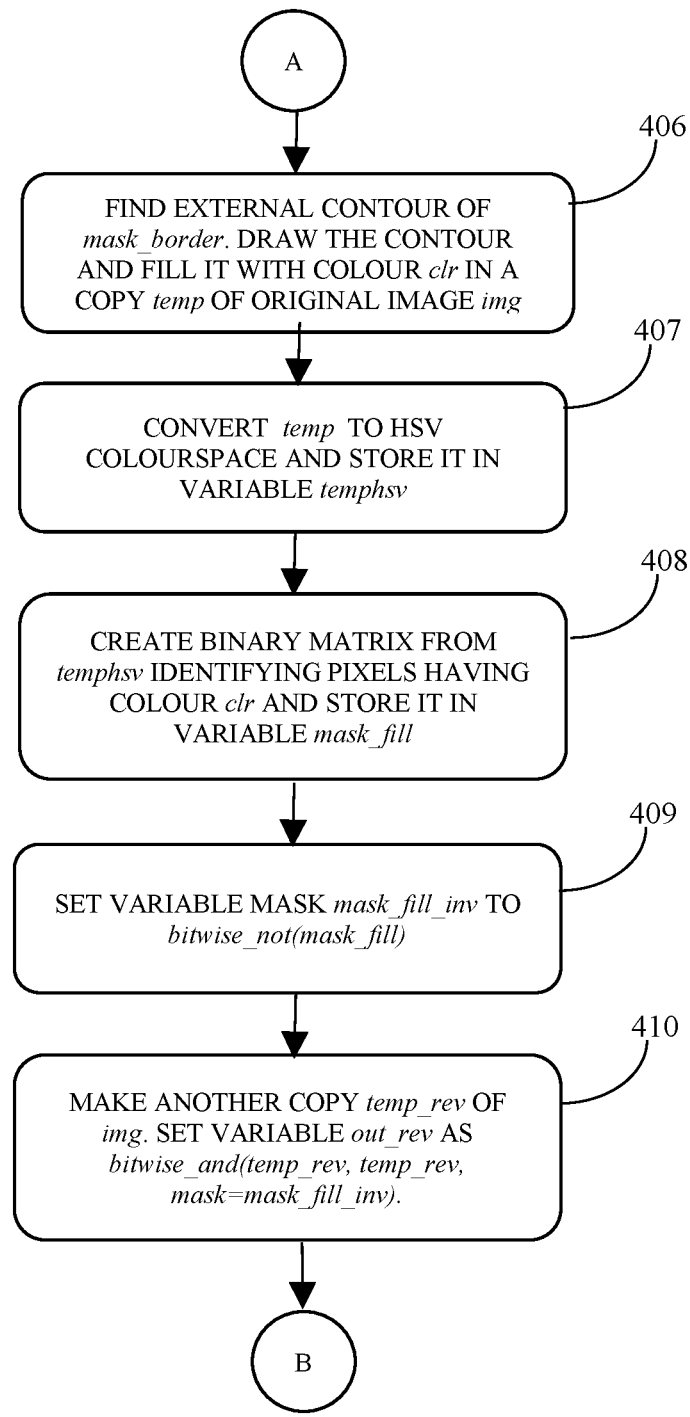
Figure 4C:
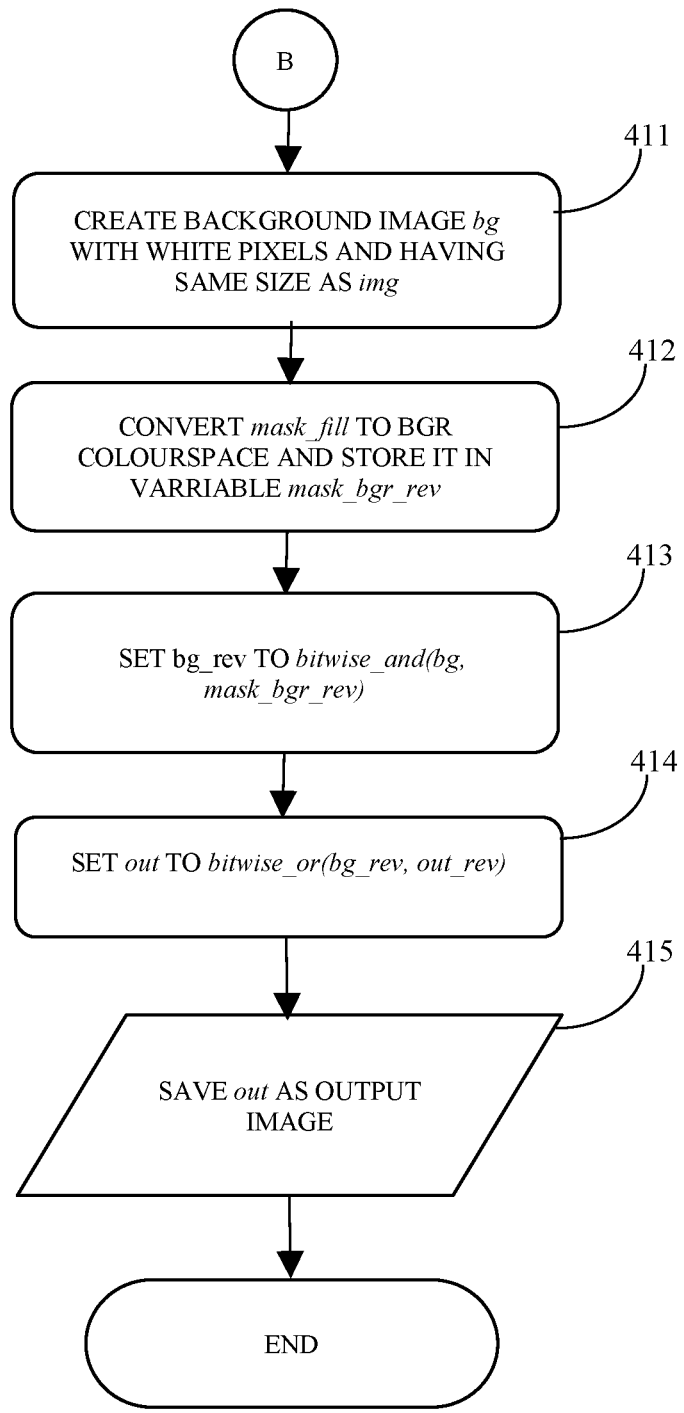

FIGS. 4A-4C illustrate a flow chart that explains operations performed by processor in executing method of eliminating outlined sections 301 of a document 300 before printing, according to one example embodiment. The intelligent image processing system is embedded within printer/copier firmware or implemented in cloud platforms. As inputs, the system accepts an input image 302 of document 300 with a closed outlined area defined by outlines 303 and name of color used for marking outline 303. The system outputs an output image 304 after eliminating outlined section 301 lying inside marked outline 303. In a preferred embodiment, the user chooses a color of a pen/marker color which is different from color of the content in the document.

In other words, the system finds contour of outline 303 and applies a series of masks to input image 302 and corresponding intermediate transformations to eliminate area inside contour. Here, a mask refers to a binary matrix having same width and height as input image 302 and values 1 denoting pixels that have color lying within a specified range. The values 0 in matrix denote pixels that do not contain a color lying within a given range. A high-level description of major steps for performing elimination is also given below:

At step 401, as shown in FIGS. 4A-4C, the input image 302 is stored as a matrix of Red-Green-Blue (RGB) values in variable img.

At step 402, outline color name is read and is stored as HSV values in variable clr.

At step 403, a lower range and an upper range of HSV values (lr, ur) is determined based on clr so that different shades of given outline 303 color is addressed.

At step 404, the image stored in img is converted to HSV color space and stored it in variable imghsv.

Figure 5:
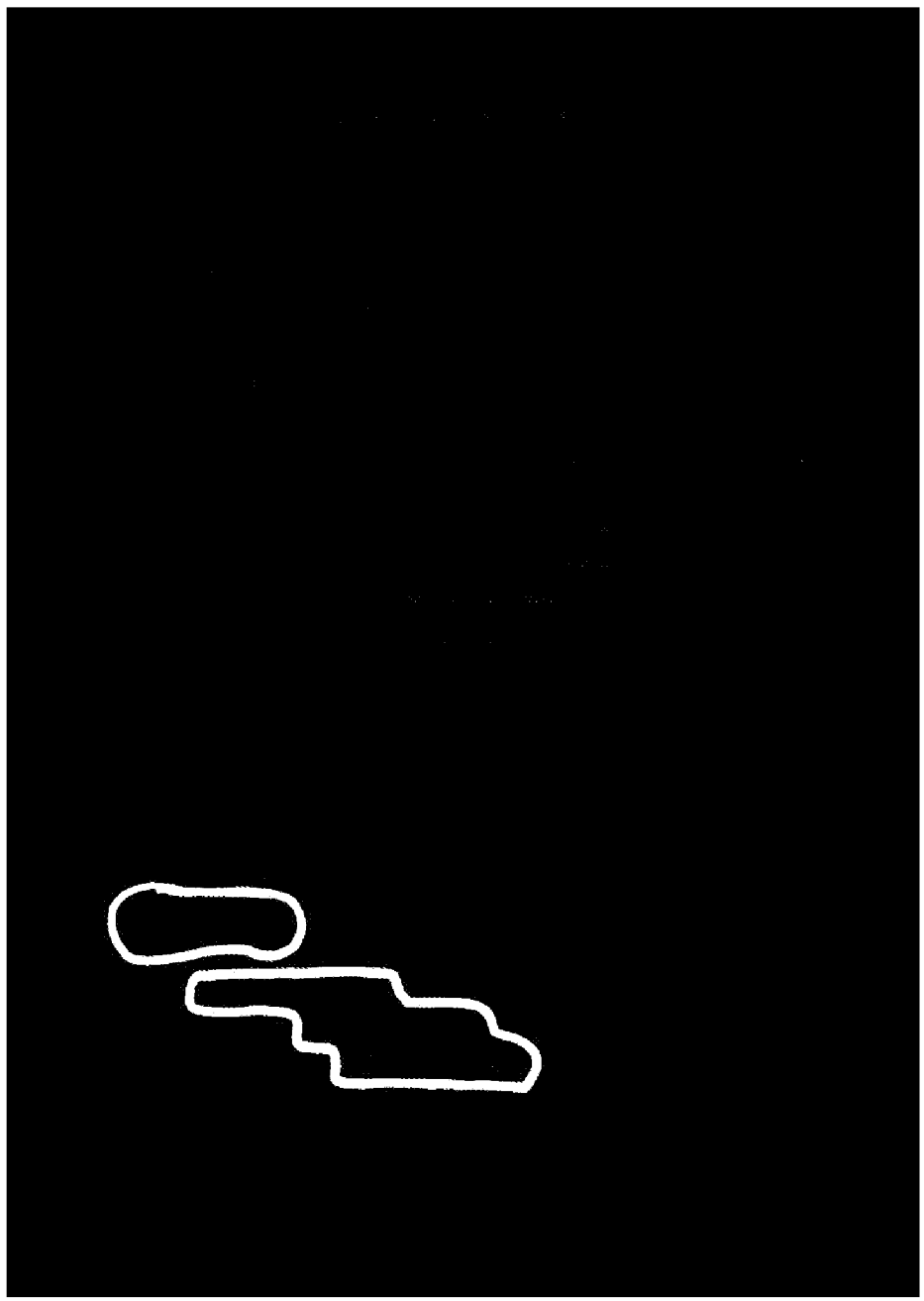
FIG. 5 shows a mask mask_border obtained from the image of the document, identifying the outline, according to one example embodiment.

At step 405, a mask mask_border is created from imghsv which identifies the one or more outlines. The mask is shown in FIG. 5. Pixels on outline 303 have color lying within a lower range and an upper range (lr, ur). In other words, a first mask is generated from the HSV color space values to identify the one or more outlines 303 of the one or more outlined sections 301, where the one or more outlines 303 have color lying within a lower range and an upper range of the HSV color space values of the color of the one or more outlines 303.

At step 406, an external contour of mask_border is found using Suzuki85 algorithm. In an embodiment, a Chain Approximation is used for determining contour points. A contour is then drawn and filled with color clr in a copy of original or input image 302 temp. This step draws an image of area inside outline 303 (including outline 303) filled with color of outline 303. Output after the step 406 is as shown in FIG. 6.

At step 407, the image temp is converted to HSV color space and stored in variable temphsv.

Figure 7:
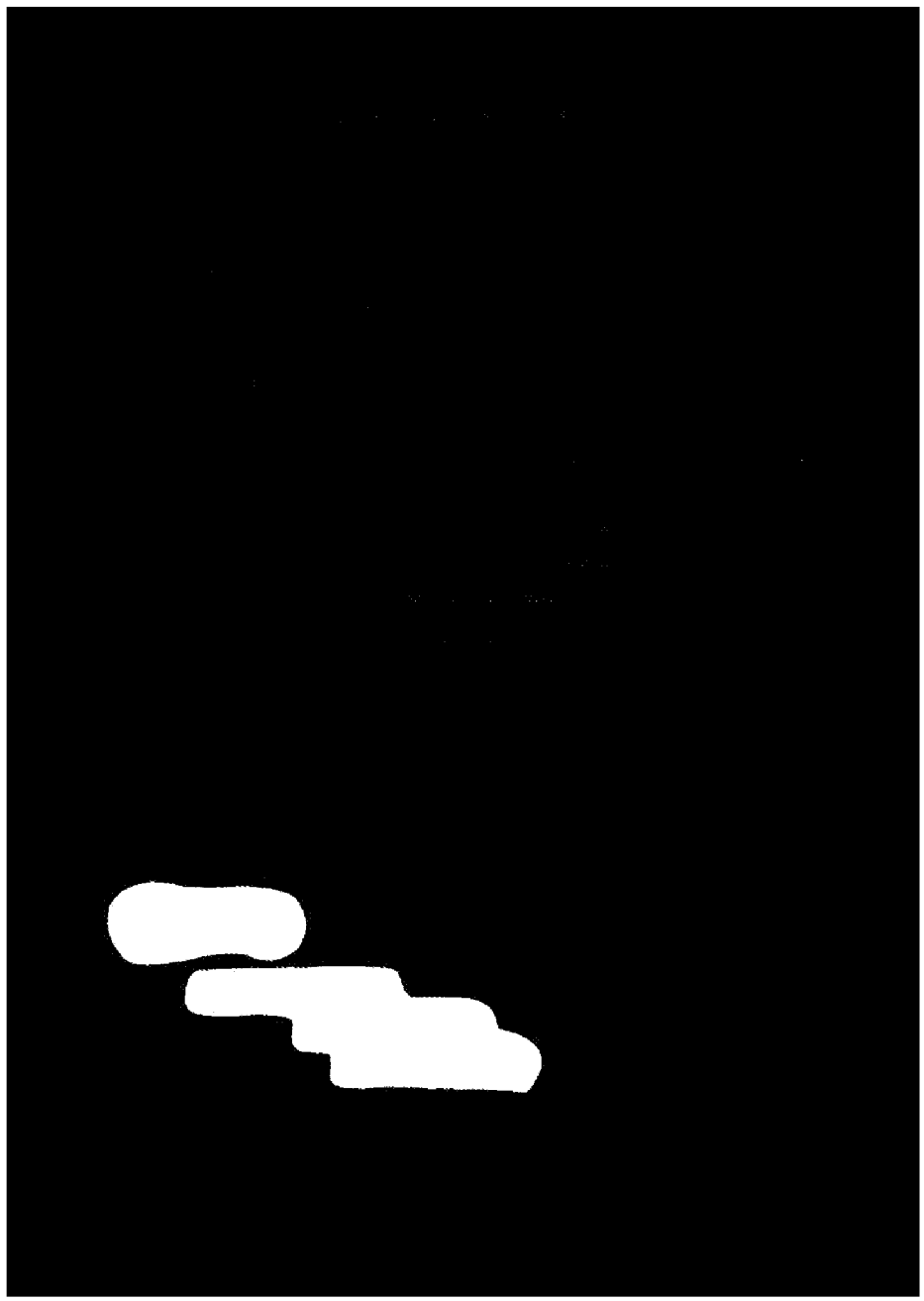
FIG. 7 is a mask mask_fill of outlined area after converting temp to HSV color space, according to one example embodiment.

At step 408, a mask is created from temphsv with pixels having color clr and stored in variable mask_fill. This is mask of outlined area and is shown in FIG. 7. Furthermore, the second mask mask_fill is generated for the one or more outlined sections 301 of the input image including filling an external contour of the first mask with the color of the one or more outlines 303 in a temporary copy of the input image 302 and converting the temporary copy to HSV color space values.

Figure 8:
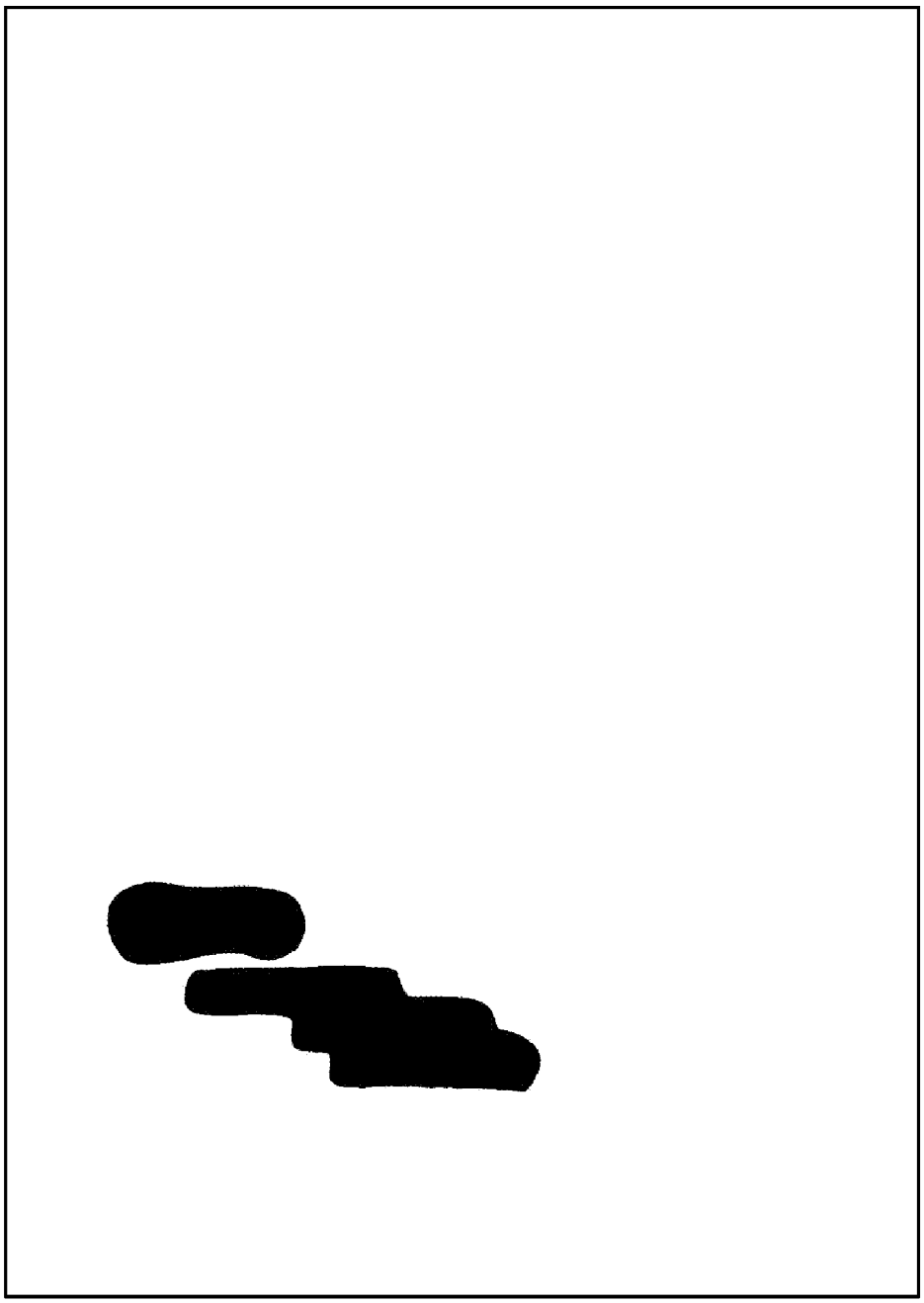
FIG. 8 is a mask mask_fill_inv after performing a bitwise-not operation on mask_fill, according to one example embodiment.

At step 409, a bitwise-not operation is set on the mask mask_fill and stored in variable mask_fill_inv. It is shown in FIG. 8.

At step 410, one more copy temp_rev is made of img and a bitwise-and operation using mask_fill_inv is performed and stored in variable out_rev which contains area outside outline, including outline 303 and area inside outline 303 is black. This output is shown in FIG. 9.

At step 411, a white background is created that needs to be imposed on black area (area inside outline) of out_rev. Hence, a background image with all white pixels and having same size as original image is created and stored in variable bg.

At step 412, mask_fill is converted to Blue Green Red (BGR) image and stored in variable mask_bgr_rev.

At step 413, a bitwise-and operation of bg and mask_bgr_rev is performed to obtain actual background image bg_rev which has all white pixels inside outlined area. In other words, the background image is obtained by a Bitwise AND operation between an image with all white pixels and a Blue Green Red (BGR) image obtained from the mask of the one or more outlined sections 301.

At step 414, a bitwise-or operation is done of out_rev obtained in Step 410 and bg_rev to obtain final output image 304 without area inside marked outline 305.

At step 415, the image is saved in a file. This is output image 304 file is shown in FIG. 3B.

Figure 10:
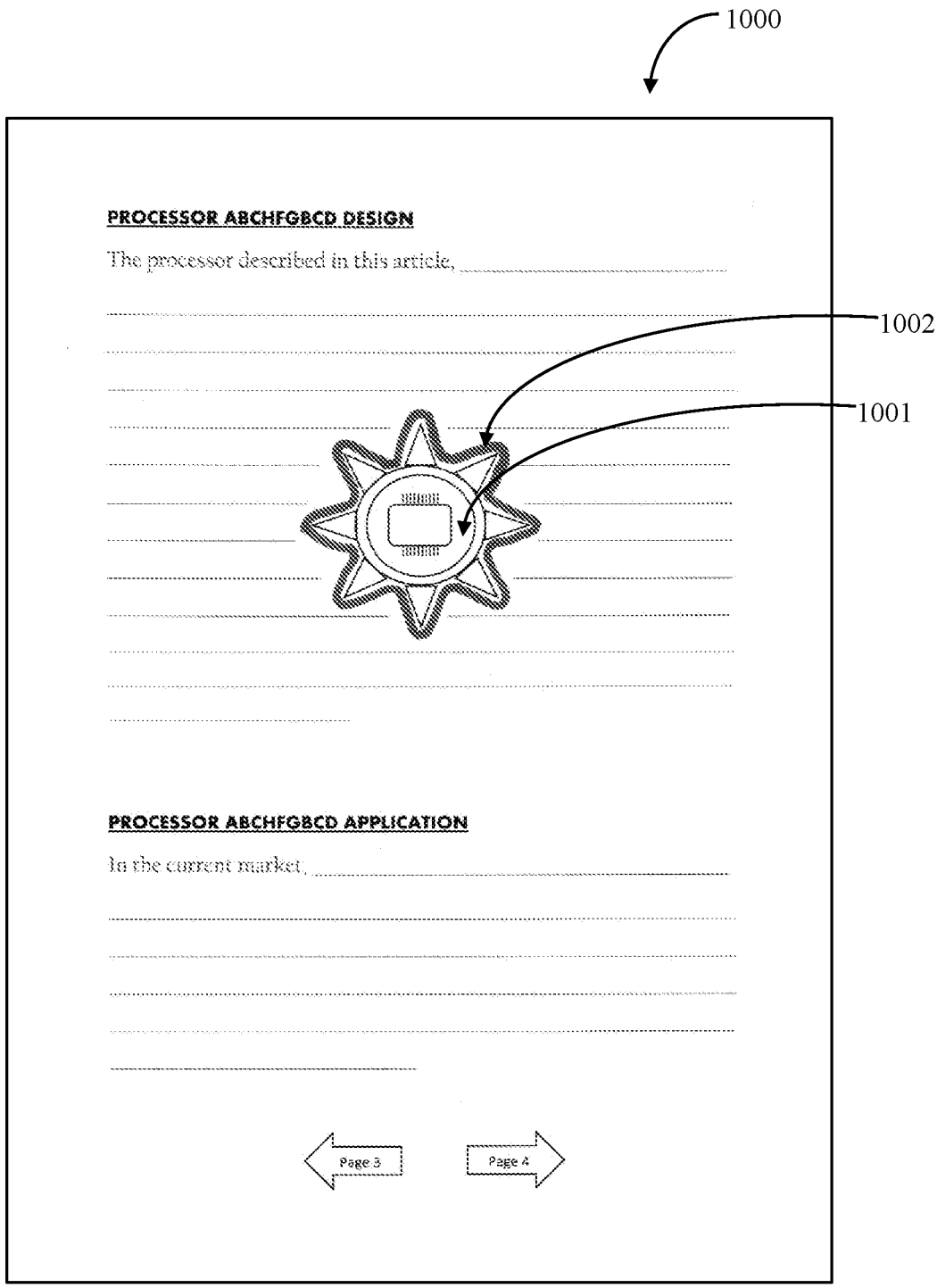
FIG. 10 is an input image with a green outline, according to one example embodiment.
Figure 11:
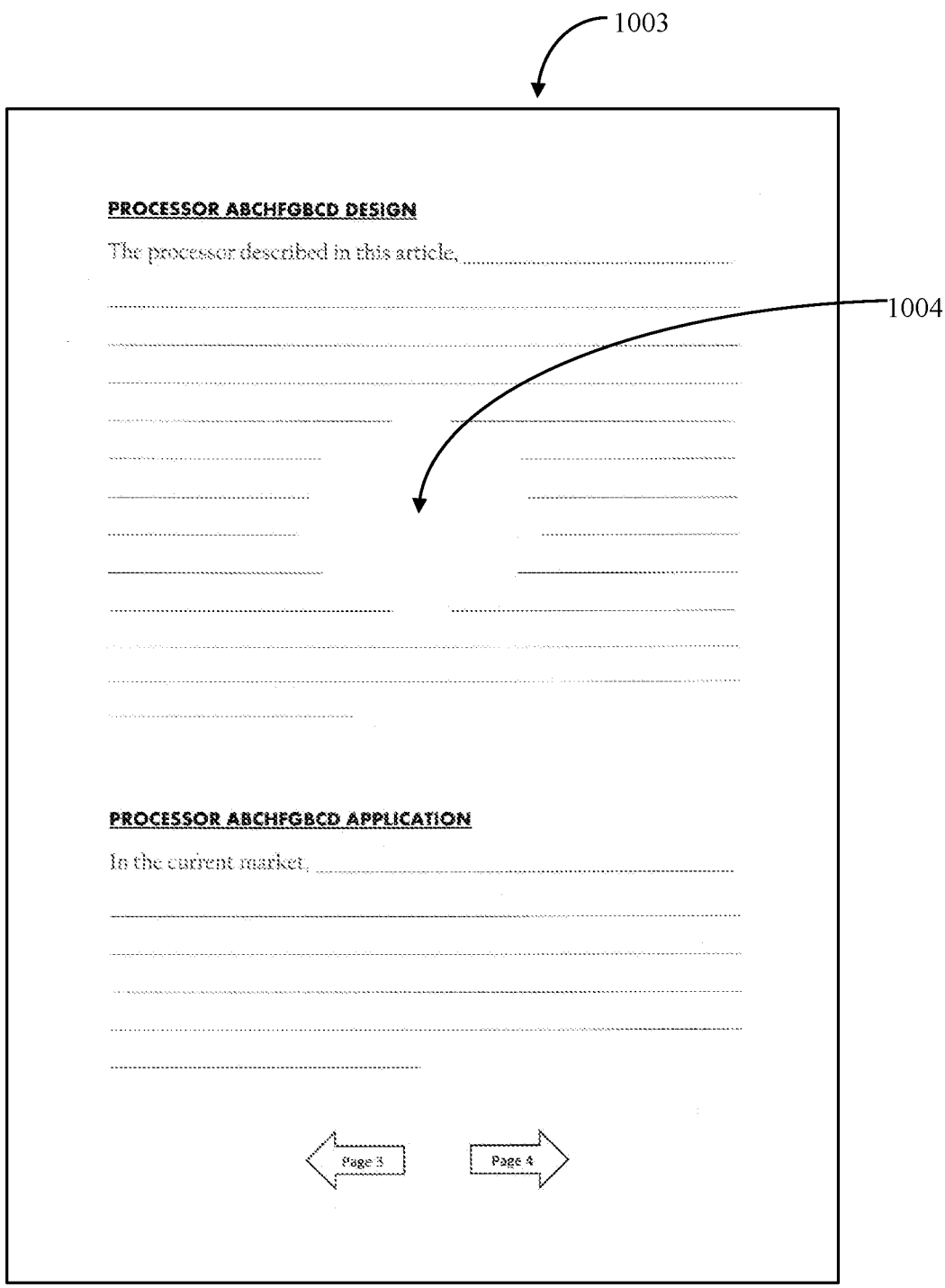
FIG. 11 is an output image for FIG. 10, according to one example embodiment.

Similarly, FIG. 10 illustrates an input image 1000 with a green outlined section 1001 using outline 1002 and FIG. 11 is output image 1003 for FIG. 10. The present system is run during copy operation, as described in previous section, to eliminate outlined area or section 1001 of document. For redaction, eliminated area 1004 may also be replaced by pixelization or any other solid figure.

The foregoing description of several methods and an embodiment of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

The invention claimed is:

1. A method of eliminating one or more outlined sections of a document before printing, the method comprising:
   receiving an input image of the document including the one or more outlined sections and a user input indicating color information of one or more outlines;
   identifying the one or more outlines and the one or more outlined sections of the input image;
   obtaining the one or more outlined sections associated with the one or more outlines of the input image; and
   outputting an output image to be printed, wherein the one or more outlined sections are eliminated from the output image of the document.

2. The method of claim 1, wherein the input image is stored as a matrix of Red-Green-Blue (RGB) values, which is converted and stored as a matrix of Hue-Saturation-Value (HSV) color space values representing the RGB matrix.

3. The method of claim 2, further comprising generating a first mask from the HSV color space values to identify the one or more outlines of the one or more outlined sections, the one or more outlines having color lying within a lower range and an upper range of the HSV color space values of the color of the one or more outlines.

4. The method of claim 2, further comprising generating a second mask of the one or more outlined sections of the input image including filling an external contour of the first mask with the color of the one or more outlines in a temporary copy of the input image and converting the temporary copy to HSV color space values.

5. The method of claim 1, wherein the output image is obtained by performing a Bitwise OR operation between an altered copy of the input image and a background image.

6. The method of claim 5, wherein the altered copy of the input image is generated by performing a Bitwise AND operation between a copy of the input image and a bitwise inverted copy of the second mask of the one or more outlined sections of the input image.

7. The method of claim 5, wherein the background image is obtained by a Bitwise AND operation between an image with all white pixels and a Blue Green Red (BGR) image obtained from the second mask of the one or more outlined sections.

8. A system for eliminating one or more outlined sections of a document before printing, the system comprising:
   one or more processors; and
   a memory storing processor-executable instructions that, when executed by the one or more processors, configure the one or more processors to:
   receive an input image of the document including the one or more outlined sections and a user input indicating color information of one or more outlines;
   identify the one or more outlines and the one or more outlined sections of the input image;
   obtain the one or more outlined sections associated with the one or more outlines of the input image; and
   output an output image to be printed, wherein the one or more outlined sections are eliminated from the output image of the document.

9. The system of claim 8, wherein the input image is stored as a matrix of Red-Green-Blue (RGB) values, which is converted and stored as a matrix of Hue-Saturation-Value (HSV) color space values representing the RGB matrix.

10. The system of claim 9, further comprising instructions that generate a first mask from the HSV color space values to identify the one or more outlines of the one or more outlined sections, the one or more outlines having color lying within a lower range and an upper range of the HSV color space values of the color of the one or more outlines.

11. The system of claim 9, further comprising instructions that generate a second mask of the one or more outlined sections of the input image including filling an external contour of the first mask with the color of the one or more outlines in a temporary copy of the input image and converting the temporary copy to HSV color space values.

12. The system of claim 8, wherein the output image is obtained by performing a Bitwise OR operation between an altered copy of the input image and a background image.

13. The system of claim 12, wherein the altered copy of the input image is generated by performing a Bitwise AND operation between a copy of the input image and a bitwise inverted copy of the second mask of the one or more outlined sections of the input image.

14. The system of claim 12, wherein the background image is obtained by a Bitwise AND operation between an image with all white pixels and a Blue Green Red (BGR) image obtained from the second mask of the one or more outlined sections.

* * * * *